W. BUTTLER.
METHOD OF FORMING GLASS SHAPES.
APPLICATION FILED JAN. 21, 1911.

1,060,583.  
Patented May 6, 1913.

WITNESSES.  
INVENTOR

UNITED STATES PATENT OFFICE.

WILLIAM BUTTLER, OF INDIANAPOLIS, INDIANA.

METHOD OF FORMING GLASS SHAPES.

1,060,583.

Specification of Letters Patent.    Patented May 6, 1913.

Application filed January 21, 1911. Serial No. 603,959.

*To all whom it may concern:*

Be it known that I, WILLIAM BUTTLER, a citizen of the United States of America, residing at Indianapolis, in the county of Marion and State of Indiana, have invented new and useful Improvements in Methods of Forming Glass Shapes, of which the following is a full, clear, and exact description.

My invention relates to a method of forming glass shapes and finishing the edges thereof, and consists broadly in first forming a sheet of glass, producing indentations or cuts in the sheet of glass so formed while the glass is in a plastic condition, and then severing the shape from the sheet by means of a suitable cutting tool, as will be hereinafter more fully described.

Heretofore in the formation of shapes of glassware for table tops, plaques, platform tops for weighing-scales, blanks for the manufacture of glass articles, and other articles of glassware, it has been customary to cut the desired shape from a sheet of glass which has first been formed and then annealed, the cutting being done by what is known in the trade as a "diamond." In the use of a diamond in cutting glassware, the edges of the cut are always more or less splintered and uneven and these edges are also sharp. This necessitates the grinding of the edge by suitable grinding apparatus, requiring generally more than one grinding, and the polishing of the edges after they have been so ground, all of which involves the employment of skilled labor, time and expense. It has also been found difficult to cut glass sheets of any considerable degree of thickness without destroying much of the glass that is so cut.

The object of my invention is to obviate these difficulties by so producing the desired shapes from sheets of glass that the edges shall be round, glazed, and smooth without the necessity of any considerable amount of cutting, or of any grinding or polishing.

I will now describe my invention so that others skilled in the art to which it appertains may understand and practise the same, reference being had to the accompanying drawings in which I show one form of apparatus which may be employed in carrying out some of the steps of my improved process. I do not, however, claim in this application, the apparatus shown in the accompanying drawings, such apparatus forming the subject matter of a companion application filed by me and of even date herewith and Serial No. 603,958.

Figure 1:
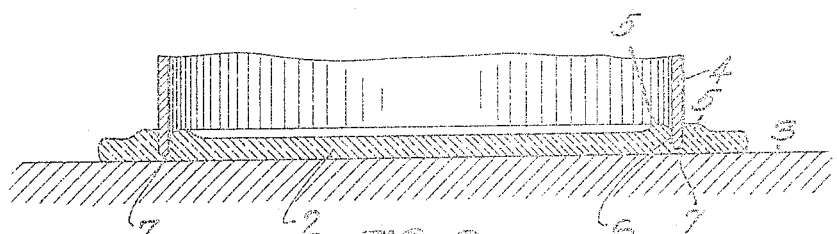
Figure 2:
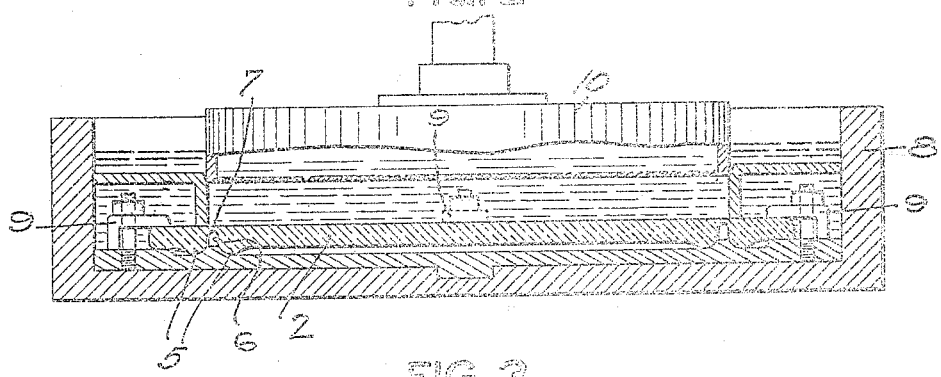
Figure 3:
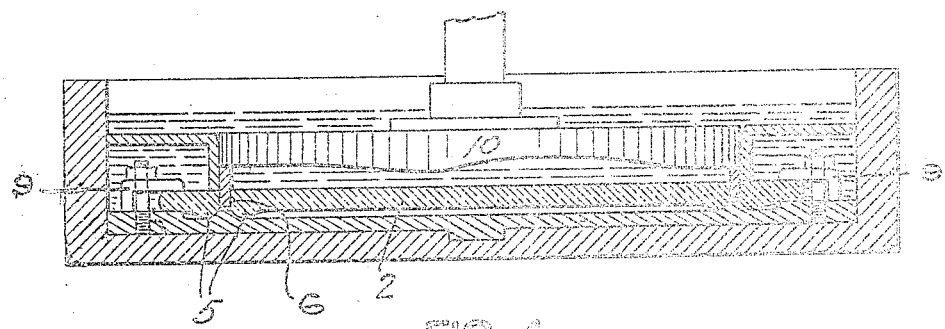
Figure 4:
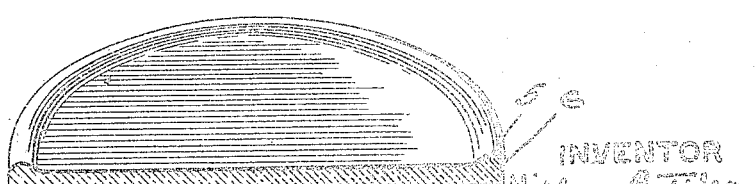

In the drawings Figure 1 is a vertical sectional view showing the glass shape as being partially formed in the plastic sheet of glass; Fig. 2 is a similar view showing the sheet of glass having the shape partially formed therein, as placed in a reverse position within a suitable receptacle containing suitable cutting medium such as emery and water and within which operates the suitable lead or cutter which severs the partially formed shape from the sheet; Fig. 3 is a similar view showing the cutter as passing through the sheet and severing the shape therefrom; and Fig. 4 is a sectional perspective view of a shape formed and finished by my improved method.

The sheet of glass from which the article is to be produced may be formed in any of the usual methods of manufacturing sheet or plate glass. This may be accomplished by the ordinary method of rolling sheet glass upon a flat table, which table may be stationary or movable according to whether it is desired to pass the table supporting the batch of molten glass, under a stationary roller or to cause the roller to be rolled over the batch of glass resting upon a stationary table, both forms of such apparatus being well known in the art. After the sheet 2 of glass has been formed upon the table 3, and while it is still hot enough to retain its plasticity, the desired shape is stamped or pressed upon the plate of glass by means of the suitable die 4 which is withdrawn before the surface of the glass becomes set. This die 4 takes the form of the outline of the article to be produced which as shown in the drawing may be circular in form, and does not contact with the remaining surface of the glass shape so as not to disturb or manipulate in any way the natural glazed surface thereof. The effect of the die 4 pressing down into the sheet of plastic glass is that of displacement, which causes the glass to rise on each side of the contacting portion of the die 4, forming the raised portion 5, and, as the glass is still in a more or less plastic condition the surface of the groove or edge 6 formed by the die 4 retains its brilliancy and smoothness upon removal of the die, for the reason that the glass is still sufficiently plastic to round itself and glaze itself by the partial flow of the surface of the glass. Unless the glass is of a certain degree of stiffness while still retaining its plasticity, the ridges 5 will settle down or flow back along the surface of the sheet, leaving the shape with a flat top or surface. Therefore, where it is desired to retain the raised edge 5 permanently on the edge of the glass article, the stamping of the die 4 should be done after the sheet has stiffened sufficiently to retain the shape caused by the displacement of the glass. This raised edge will be found, in the finished shape, particularly desirable in the case of table tops, ice-cream counters, plates for weighing scales, and other articles where it is desirable to prevent the flow of liquids which may escape or be spilled from the substance placed thereon. The displacement of the glass is only partially through the sheet, leaving the film-like connecting portion 7 between the shape and the body portion of the sheet. After the shape is partially formed in the manner above described, the sheet of glass containing the shape is placed in a reverse position within the suitable receptacle 8 and clamped in position by means of the suitable clamps 9, after which the suitable cutter 10 conforming to the diameter of the shape and under which the shape is mounted, by the clamps 9, in registry therewith, is brought into contact with the reverse side of the sheet and the thin film 7 ground or cut so as to sever the shape from the body of the sheet. This cutting by the tool 10 is preferably effected by placing within the receptacle 8 a suitable cutting or grinding medium such as emery and water or sand and water and causing the tool 10 to act as a lead therefor, said lead feeding the grinding material to the sheet at points registering with the line of displacement, formed by the die 4.

The shape may be annealed either before it is severed from the sheet, that is, before it goes to the cutting tool 10, or after it has been severed from the sheet.

As the portion 7 of the glass to be cut is of little thickness, the cutting or grinding by the tool 10 can be done without any danger of splintering or spoiling the shape, leaving the body of the edge formed by the die 4 round and glazed and smooth.

The advantages of my invention will be readily appreciated by those skilled in the art.

While I have described my method of forming glass shapes and finishing the edges thereof, in connection with a certain form of apparatus, I do not desire to limit myself thereto.

What I claim and desire to secure by Letters Patent is:

The method of forming shapes of glassware having a glazed surface and rounded periphery, which comprises producing a sheet of plastic glass, displacing the glass inwardly upon the peripheral outline of the desired shape while it is still plastic but after it has stiffened sufficiently to retain the shape caused by the displacement, and to form a surface glaze, thereby forming a raised rounded rim or periphery and leaving the glaze of the main body of the sheet undisturbed, allowing the glass to cool, positioning the sheet to bring said outline in registry with cutting means, and then separating the shape from the sheet by cutting the sheet upon the reverse side from said formed outline.

In testimony whereof, I have hereunto set my hand.

WILLIAM BUTTLER.

Witnesses:
  CHAS. HALL,
  WALTER STEWART.